United States Patent
Nguyen et al.

(10) Patent No.: US 9,385,601 B2
(45) Date of Patent: Jul. 5, 2016

(54) SMPS WITH OUTPUT RIPPLE REDUCTION CONTROL AND METHOD THEREOF

(71) Applicant: Monolithic Power Systems, Inc., San Jose, CA (US)

(72) Inventors: James Nguyen, San Jose, CA (US); Scott Yi, Fremont, CA (US)

(73) Assignee: Monolithic Power Systems Co., Ltd., San Jose, CA (US)

( * ) Notice: Subject to any disclaimer, the term of this patent is extended or adjusted under 35 U.S.C. 154(b) by 81 days.

(21) Appl. No.: 14/319,934

(22) Filed: Jun. 30, 2014

(65) Prior Publication Data

US 2015/0381043 A1    Dec. 31, 2015

(51) Int. Cl.
*H02M 3/156* (2006.01)
*H02M 3/158* (2006.01)
*H02M 1/14* (2006.01)

(52) U.S. Cl.
CPC .............. *H02M 3/158* (2013.01); *H02M 1/14* (2013.01)

(58) Field of Classification Search
CPC ............... H02M 3/155; H02M 3/156; H02M 2003/1555; H02M 2003/1566; H02M 2001/0003; H02M 2001/0009
USPC .................................. 323/282, 284, 285, 351
See application file for complete search history.

(56) References Cited

U.S. PATENT DOCUMENTS

| | | | |
|---|---|---|---|
| 7,746,043 B2 * | 6/2010 | Melanson | H02M 1/4225 323/207 |
| 8,076,919 B2 * | 12/2011 | Liu | H02M 1/4225 323/222 |
| 8,242,755 B2 * | 8/2012 | Park | H02M 1/36 323/222 |
| 8,823,344 B2 * | 9/2014 | Kushida | H02M 3/1588 323/271 |
| 8,896,284 B2 * | 11/2014 | Fan | H02M 3/1588 323/285 |
| 2010/0134080 A1 | 6/2010 | Ouyang | |
| 2010/0181983 A1 | 7/2010 | Ouyang | |
| 2012/0146606 A1 | 6/2012 | Li | |
| 2012/0235664 A1 | 9/2012 | Dong | |
| 2013/0002221 A1 | 1/2013 | Wang | |
| 2013/0002223 A1 | 1/2013 | Xi | |
| 2013/0257399 A1 | 10/2013 | Jiang | |
| 2014/0035654 A1 | 2/2014 | Jiang | |
| 2014/0125302 A1 | 5/2014 | Yang | |
| 2014/0285170 A1 | 9/2014 | Deng | |
| 2014/0375286 A1 | 12/2014 | Jiang et al. | |
| 2015/0155778 A1 * | 6/2015 | Kurokawa | H02M 3/156 323/235 |

FOREIGN PATENT DOCUMENTS

| | | |
|---|---|---|
| CN | 102751856 A | 10/2012 |
| CN | 102769378 A | 11/2012 |
| CN | 102801305 A | 11/2012 |

(Continued)

*Primary Examiner* — Gary L Laxton
(74) *Attorney, Agent, or Firm* — Perkins Coie LLP

(57) ABSTRACT

A SMPS has a switch, an inductor, a zero current detection circuit for detecting the current flowing through the inductor, a load judgment circuit and a control signal generating circuit. The load judgment circuit is coupled to the zero current detection circuit and provides a plurality of status signals based on a zero current duration of the inductor current. The control signal generating circuit generates a control signal which transits from a first state to a second state when a feedback signal satisfies a preset condition, and the control signal transits from the second state to the first state after an on time of the switch, and wherein the on time is controlled based on the plurality of status signals.

19 Claims, 5 Drawing Sheets

(56) References Cited

FOREIGN PATENT DOCUMENTS

| CN | 102946254 A | 2/2013 |
| CN | 103346662 A | 10/2013 |
| CN | 103701323 A | 4/2014 |

* cited by examiner

SMPS WITH OUTPUT RIPPLE REDUCTION CONTROL AND METHOD THEREOF

TECHNICAL FIELD

The present invention generally relates to electrical circuit, and more particularly relates to switching mode power supply.

BACKGROUND

Switching mode power supply (SMPS) is widely used to convert an input voltage into an output voltage by controlling the switching of at least one switch. In one control method, a switch of a buck converter is turned on once a predetermined condition is detected, for example, when a feedback signal indicative of the output voltage drops below a reference signal. The switch keeps in ON state with an on time period, and at the end of the time period, the switch is turned off.

Usually, the on time period of the switch during light load is the same with that during heavy load. And during light load, when the inductor current reaches zero, a synchronous rectifier is turned off to prevent the discharge of the output voltage. Accordingly, all the energy stored in the inductor is dumped into the output capacitor, and the output ripple of the output voltage is much larger than that during heavy load. And this is undesirable.

One traditional way to reduce the output ripple in light load is to adopt a large output capacitor, but this increases the size and also increases the system cost.

Accordingly, an improved method is desired to at least overcome one of the above mentioned deficiencies.

SUMMARY

One embodiment of the present invention discloses a SMPS for converting an input voltage at an input terminal into an output voltage at an output terminal, the SMPS comprising: a switch having a control end; an inductor coupled to the switch; a zero current detection circuit coupled to the inductor, the zero current detection circuit configured to detect an inductor current flowing through the inductor and provide a zero current detection signal, wherein the zero current detection signal is in an effective state only when the inductor current is at zero; a load judgment circuit coupled to the zero current detection circuit, the load judgment circuit configured to provide a plurality of status signals based on a zero current duration during when the zero current detection signal is in the effective state uninterruptedly; and a control signal generating circuit coupled to the output terminal and the load judgment circuit, the control signal generating circuit configured to provide a control signal which is coupled to the control end of the switch, wherein the control signal transits from a first state to a second state when a feedback signal indicative of an output signal at the output terminal satisfies a preset condition, and the control signal transits from the second state to the first state after an on time of the switch, and wherein the on time is controlled based on the plurality of status signals.

Another embodiment of the present invention discloses a controller for converting an input voltage of a SMPS to an output voltage at an output terminal of the SMPS by controlling a switch of the SMPS, the SMPS further comprising an inductor, the controller comprising: a zero current detection circuit coupled to the inductor, the zero current detection circuit configured to detect an inductor current flowing through the inductor and provide a zero current detection signal, wherein the zero current detection signal is in an effective state only when the inductor current is at zero; a load judgment circuit coupled to the zero current detection circuit, the load judgment circuit configured to provide a plurality of status signals based on a zero current duration during when the zero current detection signal is in the effective state uninterruptedly; and a control signal generating circuit coupled to the output terminal and the load judgment circuit, the control signal generating circuit configured to provide a control signal for controlling the switch, wherein the control signal transits from a first state to a second state when a feedback signal indicative of an output signal at the output terminal satisfies a predetermined relationship with a reference signal, and the control signal transits from the second state to the first state after an on time of the switch, and wherein the on time is controlled based on the plurality of status signals.

Yet another embodiment of the present invention discloses a method of reducing output ripple in a SMPS, the SMPS comprises a switch and an inductor, the method comprising: detecting an inductor current flowing through the inductor; detecting a zero current duration of the inductor current, wherein the zero current duration is a duration of when the inductor current is at zero in a cycle; and controlling the on time of the switch based on the zero current duration.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
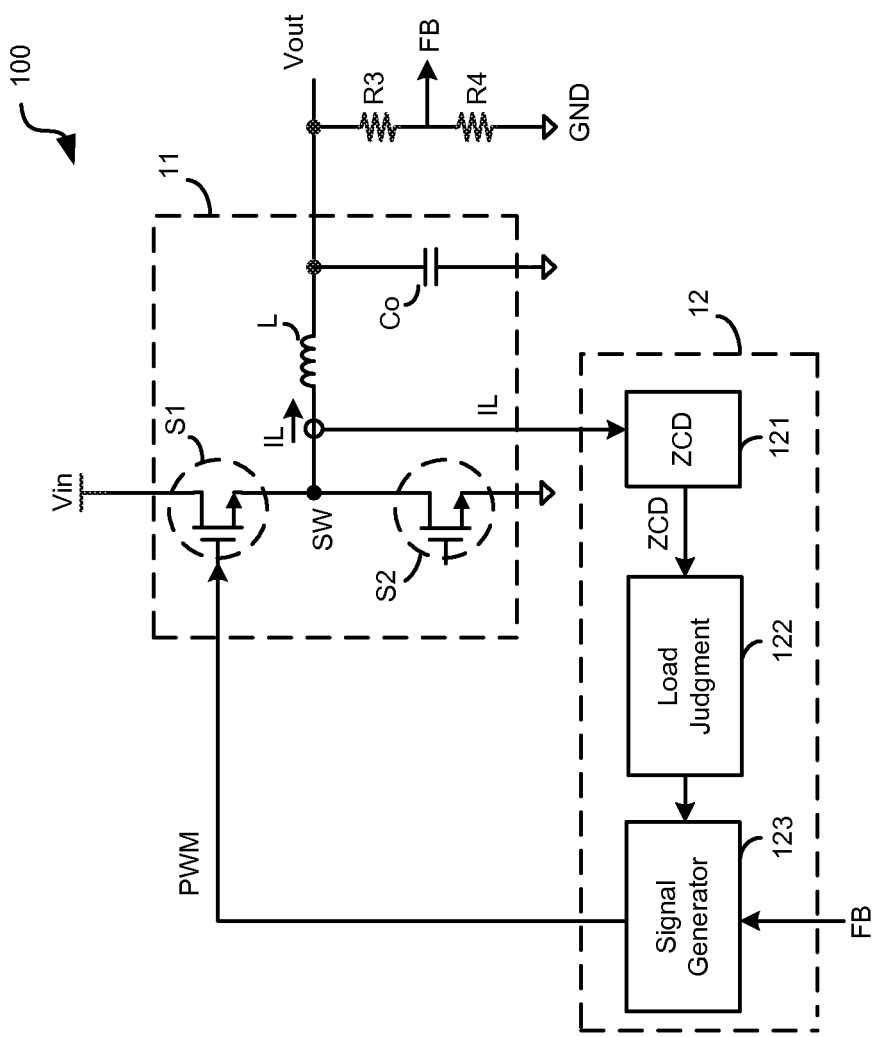
FIG. 1 illustrates a SMPS 100 comprising a switching circuit 11 and a controller 12 according to an embodiment of the present invention.

FIG. 1 illustrates a SMPS system 100 according to an embodiment of the present invention. SMPS 100 comprises a switching circuit 11 and a controller 12. Switching circuit 11 has an input terminal Vin and an output terminal Vout, and switching circuit 11 converts an input voltage at the input terminal Vin to an output voltage at the output terminal Vout by controlling the switching action of a switch S1, or by controlling the switching actions of a switch S1 and a synchronous rectifier S2. In one embodiment, switch S1 comprises a MOSFET. In another embodiment, switch S1 comprises a JFET. Switch S1 may comprise other types of switching element. Synchronous rectifier S2 comprises a switching element, such as MOSFET, JFET and so on. In another embodiment, synchronous rectifier S2 is replaced by a diode. In the shown embodiment, switching circuit 11 comprises a buck converter which comprises switch S1, synchronous rectifier S2, and an output filter which comprises an output inductor L and an output capacitor Co. However, it should be known that the SMPS according to some embodiments of the present invention may have other topologies as long as a duration of a zero current status is indicative of the load level.

Continuing with FIG. 1, switch S1 is coupled between the input terminal Vin and a switching node SW. Synchronous rectifier S2 is coupled between the switching node SW and a reference ground GND. In another embodiment, the synchronous rectifier S2 may be replaced by a non-synchronous diode. The output inductor L is coupled between the switching node SW and the output terminal Vout. And the output capacitor Co is coupled between the output terminal Vout and the reference ground. The input voltage is converted into intermittent voltages at the switching node SW by the switching actions of switches S1 and S2. The switching actions of the switch S1 and synchronous rectifier S2 are in complementary pattern and the switch S1 and the synchronous rectifier S2 are not in ON state simultaneously. The voltage at the switching node SW is filtered by the output inductor L and output capacitor Co into the output voltage which has a smoother waveform shape than the voltage at switching node SW. The output voltage at the output terminal Vout is used to supply a load.

Figure 2:
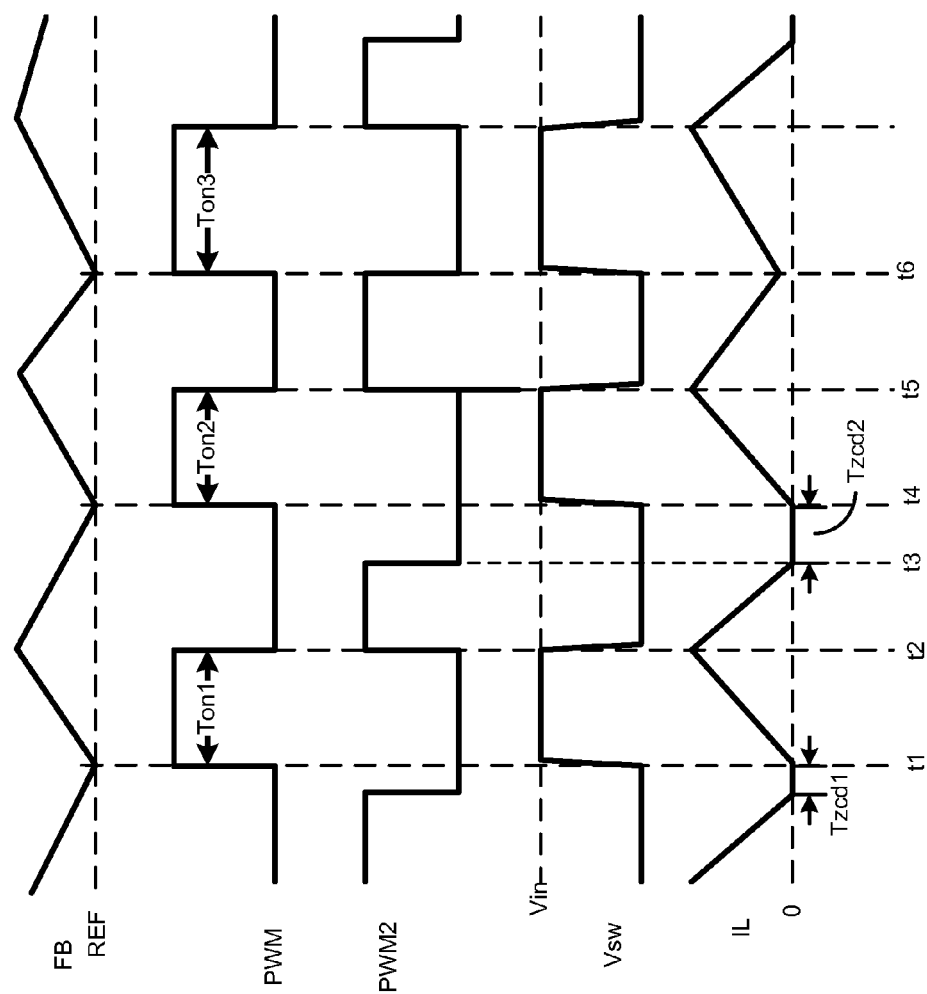
FIG. 2 illustrates a waveform diagram of signals in switching circuit 11 with reference to FIG. 1 according to an embodiment of the present invention.

FIG. 2 illustrates a waveform diagram of signals in switching circuit 11 with reference to FIG. 1 according to an embodiment of the present invention. The signals include a switching control signal PWM that is supplied to the control end of the switch S1, a second switching control signal PWM2 that is supplied to the control end of the synchronous rectifier S2, a switching voltage Vsw at the switching node SW, and an inductor current IL which flows through the output inductor L. At time t1, a feedback signal FB indicative of an output signal at the output terminal Vout decreases and reaches a predetermined reference REF, and switching control signal PWM transits from an ineffective state to an effective state. And the switch S1 is turned on. At the meantime, signal PWM2 transits from effective state to ineffective state to turn off the synchronous rectifier S2. The switching voltage Vsw at the switching node SW increases to approximate the input voltage Vin, and inductor current IL increases from zero. After an on time Ton1, at time t2, switching control signal PWM transits from effective state to ineffective state and switching control signal PWM2 transits from ineffective state to effective state. Switch S1 is turned off and synchronous rectifier S2 is turned on, switching voltage Vsw decreases to approximate ground voltage, and current flows through the synchronous rectifier S2 and the output inductor L. Inductor current IL starts to decrease. When the load is light, inductor current IL decreases quickly, and when the load is heavy, inductor current IL decreases slowly. At time t3, inductor current IL decreases to zero, and at the meantime, the rectifier S2 is turned off to prevent discharging the output capacitor Co and inductor current IL maintains at zero. Output voltage Vout decreases and at time t4, the feedback signal FB drops to the reference signal REF again and switching control signal PWM transits from ineffective state to effective state for turning on switch S1. When the load is high, the inductor current IL decreases slowly and when the feedback signal FB drops to the predetermined reference REF again at time t6, the inductor current IL is higher than zero. In the present invention, the on time of switching control signal PWM which controls the switch S1 in ON state is regulated according to the load level, and in particularly, according to the time duration of when the inductor current IL is in continuous zero, or called zero current duration. For example, on time Ton1 is determined by the zero current duration Tzcd1 at the previous cycle, on time Ton2 is determined by zero current duration Tzcd2, and on time Ton3 is determined by zero current duration Tzcd3. When the zero current duration Tzcd2 is long, it indicates that the load is light, and the on time Ton2 for the next cycle is short. And when the zero current duration is short, for example, the zero current duration before time t6 is zero, the on time Ton3 for the next cycle is very long.

Continuing with FIG. 1, controller 12 comprises a zero current detection circuit 121 (ZCD), a load judgment circuit 122 and a control signal generating circuit 123. Zero current detection circuit 121 has an input coupled to the switching circuit 11, and has an output configured to provide a zero current detection signal ZCD. In the shown embodiment, zero current detection circuit 121 is coupled to the output inductor L configured to detect the current status of a current IL flowing through the output inductor L. For example, when current IL is at zero, the zero current detection signal ZCD is in an effective state, for example logic HIGH, and when current IL is higher than zero, the zero current detection signal is in an ineffective state, for example logic LOW. Zero current detection circuit 121 may comprise a current detecting circuit and a comparing circuit, and the current detecting circuit may be in any possible type, including adopting the conventional multiple current detecting methods. Load judgment circuit 122 receives the zero current detection signal ZCD, and providing at least one status signal based on the zero current detection signal. As described above, inductor current IL decreases quickly during light load, and decreases slowly during heavy load. Thus the zero current duration during when the zero current detection signal ZCD is in effective state is indicative of the load level. And the at least one status signal generated by the load judgment circuit 122 is generated based on the zero current detection signal ZCD. In one embodiment, each of the at least one status signal provided by the load judgment circuit 122 is logic signal which is either in logic HIGH state or logic LOW state. In one embodiment, the load judgment circuit 122 generates only one status signal, and a first logic state of the status signal indicates a first load level, and a second logic state of the status signal indicates a second load level. For example, logic HIGH state of the status signal indicates a heavy load which may control the on time of switch S1 to be long, and logic LOW state of the status signal indicates a light load which may control the on time of switch S1 to be short. In another embodiment, the load judgment circuit 122 generates a plurality of status signals, and the different configuration of the status signals corresponds to different on times of the switch S1. Where the phrase "plurality" refers to a number equal to 2 or higher than 2.

Control signal generating circuit 123 receives the at least one status signal provided by load judgment circuit 122 and a feedback signal FB which is indicative of an output signal at the output terminal Vout, and generates at its output the switching control signal PWM according to the at least one status signal and the feedback signal FB. In one embodiment, the control signal generating circuit further comprises additionally a second switching control signal for controlling synchronous rectifier S2. In one embodiment, the feedback signal FB is indicative of the output voltage at the output terminal Vout. In one embodiment, the feedback signal FB is proportional to the output voltage, and the control signal PWM transits from logic LOW to logic HIGH when the feedback signal FB drops below a reference signal REF. And in another embodiment, the feedback signal FB may be reverse to the output voltage, and the control signal transits from logic LOW to logic HIGH to turn on the main switch when the feedback signal is higher than a reference signal. In one embodiment, a driver circuit is coupled between the output of the control signal generating circuit 123 and switch S1, and to drive switch S1 with adequate voltage amplitude.

Figure 3:
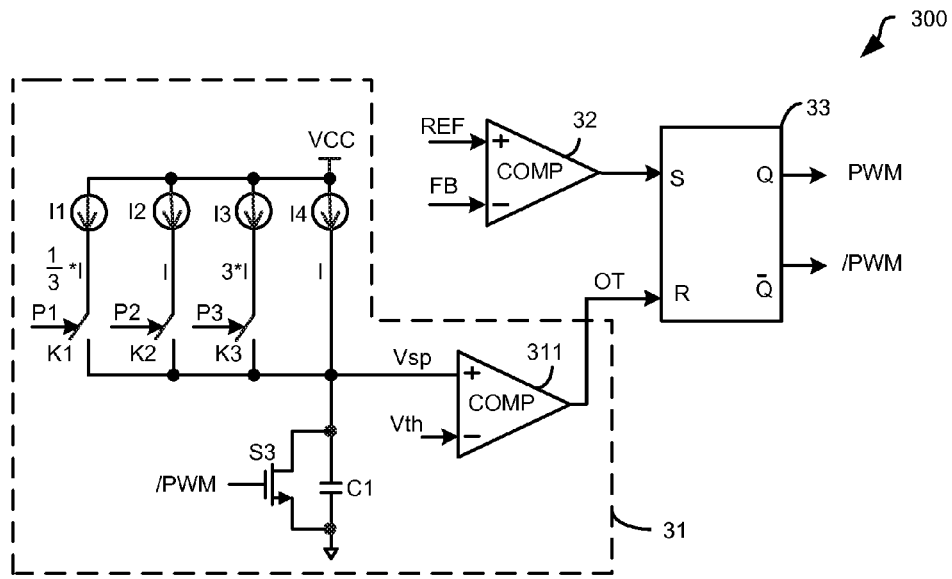
FIG. 3 illustrates a control signal generating circuit 300 in a controller according to an embodiment of the present invention.

FIG. 3 illustrates a control signal generating circuit 300 according to an embodiment of the present invention. Control signal generating circuit 300 comprises an on time signal generator 31, a comparator 32 and an RS flip-latch 33. Comparator 32 has a first input receiving a feedback signal FB, a second input receiving a reference signal REF, and an output coupled to the RS flip latch 33. Comparator 32 compares the feedback signal FB with the reference signal REF and sets the RS flip latch 33 when feedback signal FB is lower than the reference signal REF. In one embodiment, feedback signal FB is proportional to the output voltage at the output terminal of the SMPS. On time signal generator 31 generates an on time signal OT configured to reset the RS flip latch 33 when the on time signal OT transits from an ineffective state to an effective state, for example when transiting from logic LOW state to logic HIGH state. RS flip latch 33 has a setting input (S) coupled to the output of comparator 32, a resetting input (R) coupled to the output of on time signal generator 31, a first output providing a switching control signal PWM and a second output providing a signal /PWM which is in a complementary pattern with signal PWM, or called an inverse signal of the control signal PWM. When feedback signal FB is lower than the reference signal REF, switching control signal PWM transits into effective state, for example, from logic LOW state to logic HIGH state to turn on switch S1. After a time period, on time signal OT transits from logic LOW state to logic HIGH state, and accordingly switching control signal PWM transits from logic HIGH state to logic LOW state to turn off switch S1. Thus the on time of switching control signal PWM is determined by on time signal OT. On time signal generator 31 comprises a plurality of current sources I1-I4, a plurality of switches K1-K3, a capacitor C1, a switch S3 coupled across capacitor C1, and a comparator 311, wherein each current source is coupled in series with a corresponding switch, for example current source I1 is coupled in series with switch K1. The sets of serially coupled current source and switch are coupled in parallel and have a common end coupled to comparator 311 and capacitor C1. Switches K1-K3 are controlled by a plurality of status signals P1-P3 provided by the load judgment circuit.

The status signals P1-P3 controls the actual current that charges capacitor C1 and thus controls the on time of the switch S1. When the load is heavy, status signals P1-P3 control the actual current which charges capacitor C1 to be low, and the on time is long. When the load is light, judgment signals P1-P3 control the actual current to be high, and the on time is short, accordingly the energy stored in the output inductor is reduced and the output ripple at the output terminal is reduced accordingly. By controlling the switches K1-K3, the on times having a number of predetermined values. In one embodiment, status signals P1-P3 controls that the on time increases or decreases step by step. That is, for two adjacent switching cycles of switch S1, the respective on times are two adjacent values among the ordinal predetermined values.

When switch K1 is in ON state and switches K2 and K3 are in OFF state, current sources I1 and I4 charge capacitor C1 when switch S3 is in OFF state, and the current that charging capacitor C1 is 4/3 I. When switch K2 is in ON state and switches K1 and K3 are in OFF state, the current which charges capacitor C1 is 2 I. When switch K3 is in ON state and switches K1 and K2 are in OFF state, the current which charges capacitor C1 is 4 I. When switches K1 and K2 are in ON state and switch K3 is in OFF state, the current that charges capacitor C1 is 7/3 I. Thus, according to different load levels, the actually current that charges capacitor C1 is controlled by the plurality of status signals P1-P3. When switching control signal PWM transits from ineffective state to effective state for turning on switch S1, signal /PWM transits to ineffective state and switch S3 is turned off. Accordingly current starts charging capacitor C1 and the voltage Vsp across capacitor C1 increases. When voltage Vsp is higher than a reference signal Vth, on time signal OT transits to logic HIGH to reset RS flip latch, and switching control signal PWM transits from effective state to ineffective state to turn off the switch S1. Then signal /PWM transits to effective state and turns on the switch S3. Accordingly, voltage Vsp decreases to ground voltage, and signal OT transits LOW. Accordingly, the on time Ton when switch S1 is in ON state equals:

$$Ton = \frac{C1 * Vth}{Ic},$$

where Ic is the current charging capacitor C1. When all the switches K1, K2 and K3 are in OFF state, the on time for the system has the longest duration TON, which is $$TON = \frac{C1 * Vth}{I}.$$

When the current charging capacitor C1 increases, the on time decreases. When switch K1 is turned on, the on time is 75% TON, wherein $$Ton = \frac{C1 * Vth}{I + \frac{1}{3}I} = \frac{3}{4}TON.$$

Similarly, when only switch K2 is turned on, the on time is 50% TON, and when only switch K3 is turned on, the on time is 25% TON. It should be known that the number of switches and the values of the current sources of the on time signal generator 31 are not confined to the embodiment shown in FIG. 3.

Figure 4:
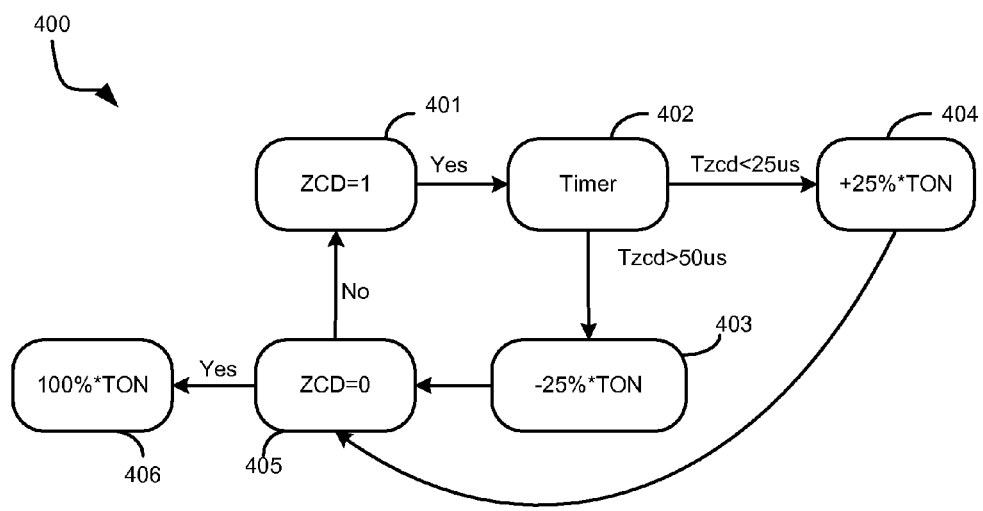
FIG. 4 illustrates a workflow diagram of a method 400 for reducing output ripple in a SMPS by controlling the on time based on a zero current duration of an output inductor according to an embodiment of the present invention.

FIG. 4 illustrates a workflow diagram of a method 400 of reducing output ripple in a SMPS according to an embodiment of the present invention. The SMPS comprises a switch and an inductor, wherein by controlling the switching action of the switch, the output voltage of the SMPS is regulated. As described above, the zero current duration of the inductor current is indicative of the load condition. The method 400 comprises in step 401 detecting whether the inductor current is at zero. If the inductor current is at zero, a zero current detection signal ZCD is in logic HIGH (ZCD=1). When the inductor current drops to zero, the zero current signal ZCD transits to logic HIGH (ZCD=1). At this time, referring to step 402, at least one timer starts to count the zero current duration Tzcd of when the inductor current is at zero (ZCD=1) uninterruptedly. When the zero current duration surpasses an internal predetermined reference time, the timer overflows and the output of the timer transits from logic LOW to logic HIGH. When a preset condition is satisfied, a PWM signal supplied to the switch transits from logic HIGH to logic LOW. At this time, according to the output of the at least one timer, the range of the zero current duration Tzcd can be detected, and the load condition is detected. If the zero current duration Tzcd is longer than a first reference time, for example 50 us, referring to step 403, it indicates that the load is light, and the on time for the switch decreases by a constant value, for example decreases by 25% TON. Where TON is the maximum on time of the switch. For example, when the latest on time of the switch in the past cycle is 75% ON, then the on time for the present cycle is 50% TON. If the zero current duration Tzcd is shorter than a second reference time (referring to step 404), for example 25 us, it indicates that the load is heavy, and the on time for the switch increases by a constant, for example 25% TON. Where the first reference time is larger than the second reference time. In this way, the on time during light load is decreased, the energy stored in the inductor is reduced, and the output ripple is decreased accordingly. In other embodiments, the on time increases or decreases with other values for one cycle, for example 10% TON, 5% TON, etc. At the time point just before the PWM signal transits from logic LOW to logic HIGH, referring to step 405, judging whether the inductor current is higher than zero (ZCD=0). If at that time, the inductor current is still higher than zero (ZCD=0), which means that the zero current duration is zero and the load is very heavy, then in step 406, the on time of the switch is set to be the maximum value TON. Since the switch is turned on when the PWM signal transits from logic LOW to logic HIGH, the inductor current increases and zero current signal ZCD is in ineffective state (ZCD=0). Then, the method turning back to step 401.

In this method, when the load is heavy, for example, Tzcd<25 us, the on time of the switch increases cycle by cycle with a predetermined constant, and when the load is light, for example, Tzcd>50 us, the on time decreases cycle by cycle with a constant. Thus, the output voltage changes smoothly. And however, if the load is very heavy that the system works under continuous current mode, the on time of the switch is set to the maximum value TON.

Figure 5:
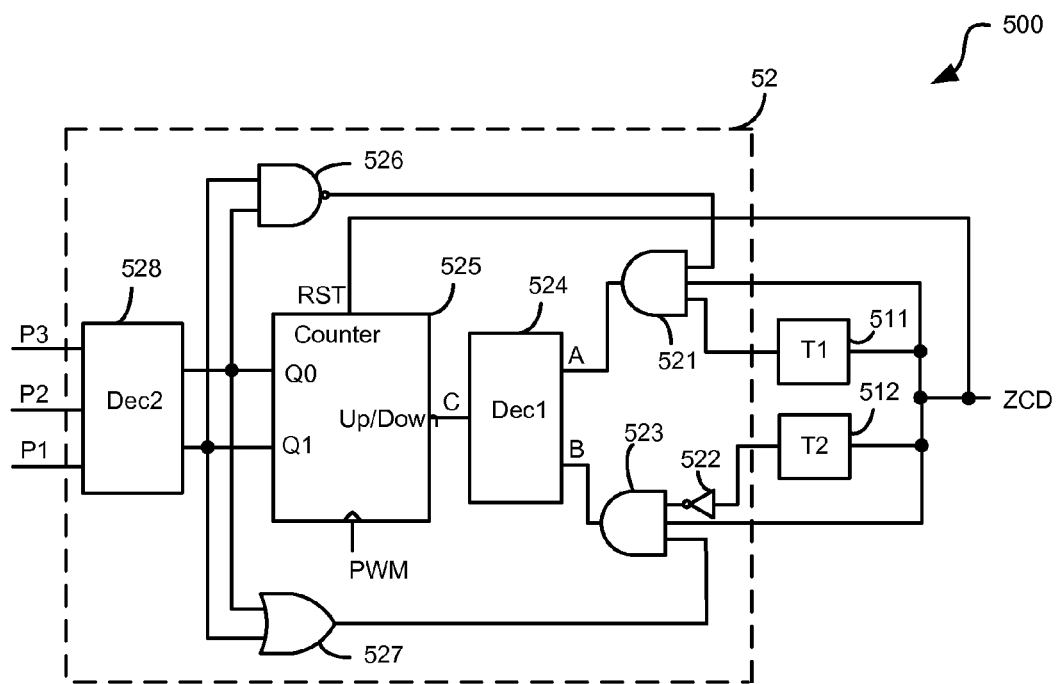
FIG. 5 illustrates a load judgment circuit 500 in a controller for generating a plurality of status signals P1-P3 according to an embodiment of the present invention.

FIG. 5 illustrates a load judgment circuit 500 for generating a plurality of status signals P1-P3 according to an embodiment of the present invention. Load judgment circuit 500 comprises a plurality of timers 511 (T1) and 512 (T2), and a status signal generating circuit 52. In the shown embodiment, the load judgment circuit 500 comprises a first timer 511 and a second timer 512. The first timer 511 and the second timer 512 are adopted to detect the range of the zero current duration and determine the load condition. The status signal generating circuit 52 generates a plurality of status signals P1-P3 based on the zero current duration Tzcd of the zero current detection signal ZCD. Generally, when the zero current duration Tzcd increases, the on time of the switch decreases and when the zero current duration Tzcd decreases, the on time of the switch is controlled to increase.

The first timer 511 has an input and an output, wherein the input receives the zero current detection signal ZCD and the output providing a first timing signal. The second timer 512 has an input and an output, wherein the input receives the zero current detection signal ZCD and the output providing a second timing signal. The first timer 511 has a first reference time Tm and the second timer 512 has a second reference time Ts, wherein the first reference time is larger than the second reference time. Both the timers 511 and 512 start counting when the zero current detection signal ZCD transits from logic LOW state to logic HIGH state (at the rising edge of ZCD=0 to ZCD=1). At this time, the first timing signal and the second timing signal are in logic LOW state. If the zero current duration Tzcd of the zero current signal ZCD is longer than the first reference time Tm, then at the end of time Tm, signal ZCD is still in logic HIGH state, and the first timing signal provided by the first timer 511 transits from logic LOW state to logic HIGH state. And if the zero current duration Tzcd is shorter than the first reference time Tm, the first timing signal remains in logic LOW state. If the zero current duration Tzcd is longer than the second reference time Ts, then at the end of time Ts, the second timing signal provided by the second timer 512 transits to logic HIGH state. And if the zero current duration Tzcd is shorter than the second reference time Ts, the second timing signal remains in logic LOW state. At the timing edge of when signal PWM transits from logic LOW state to logic HIGH state, if the first timing signal is in logic HIGH state (Tzcd>Tm), it indicates that the load is light. And if the second timing signal is in logic LOW state (Tzcd<Ts), it indicates that the load is heavy.

Status signal generating circuit 52 generates the status signals P1-P3 based on the first timing signal and the second timing signal provided by timers 511 and 512.

Status signal generating circuit 52 comprises a first AND gate 521, a NOT gate 522, a second AND gate 523, a first decoder 524, a counter 525, a NAND gate 526, an OR gate 527 and a second decoder 528. The first AND gate 521 has three inputs and an output, wherein the first input of AND gate 521 is coupled to the output of NAND gate 526, the second input receives the zero current detection signal ZCD, the third input is coupled to the output of the first timer 511 to receive the first timing signal, and the output of the AND gate 521 provides a logic signal A. The NOT gate 522 has an input coupled to the output of the second timer 512, and NOT gate 522 inverts the second timing signal. The second AND gate 523 has three inputs and an output, wherein the first input is coupled to the output of the NOT gate 522, the second input receives the zero current detection signal ZCD, the third input is coupled to the output of the OR gate 527, and the output provides a second logic signal B. The first decoder 524 has two inputs and an output, wherein the first input receives the logic signal A, the second input receives the logic signal B, and the output provides a third logic signal C. The counter 525 has three inputs and an output, wherein the first input receives logic signal C, the second input is a timing input and receives signal PWM, the third input is a reset input RST and receives the zero current detection signal ZCD, and the two outputs provides a first signal Q0 and a second signal Q1 that are used to control the on time of the switch. The NAND gate 526 has two inputs coupled to the two outputs of the counter 525 and has an output coupled to the first AND gate 521. The OR gate 527 has two inputs coupled to the two outputs of the counter 525, and has an output coupled to AND gate 523. The second decoder 528 has two inputs coupled to the outputs of the counter 525 respectively, and has three outputs providing three status signals P1, P2 and P3.

The function of the load judgment circuit 500 will be described with reference to two functional tables according to an embodiment of the present invention. Signals Q0 and Q1 outputted by counter 525 represent a two-bit digital signal, wherein the low bit is Q0 and the high bit is Q1. The two-bit digital signal (Q1,Q0) determines the on time of the switch. Table 1 below illustrates the function of the second decoder 528 and the on time of the switch:

TABLE 1

| Q1 | Q0 | Decoder2 | ON Time |
|----|----|----|----|
| 0 | 0 | N/A | Ton |
| 0 | 1 | P1 | 75%*Ton |
| 1 | 0 | P2 | 50%*Ton |
| 1 | 1 | P3 | 25%*Ton |

When signal (Q1,Q0)=(0, 0), all the status signals P1, P2 and P3 are in logic LOW state, and the on time of the switch is set at a maximum value TON. When signal (Q1,Q0)=(0, 1), status signal P1 is in logic HIGH state, and status signals P2 and P3 are in logic LOW state, and the on time of the switch is set at 75% TON. When signal (Q1,Q0)=(0, 1), status signal P1 is in logic HIGH state, status signals P2 and P3 are in logic LOW state, and the on time of the switch is set at 75%*TON. When signal (Q1,Q0)=(1, 0), status signal P2 is in logic HIGH state, status signals P1 and P3 are in logic LOW state, and the on time of the switch is set at 500%*TON. When signal (Q1,Q0)=(1, 1), status signal P3 is in logic HIGH state, status signals P1 and P2 are in logic LOW state, and the on time of the switch is set at 25%*TON.

The output signal (Q1,Q0) of the counter 525 is determined by signals C and signal ZCD clocked by the leading edge of the PWM signal, wherein the leading edge is when the PWM signal transits from logic LOW state to logic HIGH state. At the leading edge of the PWM signal, if the load is heavy and inductor current is higher than zero, signal ZCD is in logic LOW state (ZCD=0), and the counter 525 is reset. Thus the output of the counter 525 is reset to be (Q1,Q0)=(0,0), and the on time of the switch is set at the maximum value TON. At the leading edge of the PWM signal, if signal ZCD is in logic HIGH state (ZCD=1), the functions of the first decoder 524 and the counter 525 are shown in Table 2 as follows:

TABLE 2

| A | B | C | Counter |
|---|---|---|---|
| 0 | 0 | Ignore | X |
| 1 | 0 | 1 | Up |
| 0 | 1 | 0 | Down |
| 1 | 1 | Ignore | X |

If signal A is in logic HIGH state ("1") and signal B is in logic LOW state ("0"), the output signal C of the first decoder 524 is in logic HIGH state ("1"), the two-bit digital signal (Q1,Q0) output by the counter 525 increases by 1 (Up), and the on time of the switch decreases by 25%*TON. The logic HIGH state of signal A requires that both the output of the NAND gate 526 and the output of the AND gate 521 are in logic HIGH state. Thus it is required that the output of the counter (Q1,Q0)≠(1,1) which means that the latest on time is not at the minimum value, and the load is light such that the zero current duration is longer than the first reference time Tm. At this situation, the second timing signal provided by the second timer 512 must be in logic HIGH state and signal B is in logic LOW state. In summary, the on time of the switch decreases by 25%*TON when the latest on time is not at the minimum value and the load is light.

If signal A is in logic LOW state ("0") and signal B is in logic HIGH state ("1"), signal C is set to be in logic LOW state ("0"), the output signal (Q1,Q0) of counter 525 decreases by 1 (Down), and the on time of the switch increases by 25%*TON. The logic HIGH state of signal B requires that the output of the second timer 512 is in logic LOW state and the output signal of the counter 525 (Q1,Q0)≠(0,0) which means that the zero current duration Tzcd of the inductor current is shorter than the second reference time, and the latest on time is not at the maximum value TON. In this situation, the output of the first timer 511 is in logic LOW state and signal A is in logic LOW state. In summary, the on time of the switch increases by 25%*TON when the latest on time is not at the maximum value and the load is heavy.

When signals A and B are both in logic LOW ("0"), or signals A and B are both in logic HIGH ("1"), signal C would be in a third status, for example a high-resistance state, and the output (Q1,Q0) of the counter 525 would keep unchanged at the clocking of the PWM signal. These situations include a first situation that when the load is moderate and the zero current duration is between the first reference time and the second reference time, a second situation that the latest on time for the past cycle is at a maximum value when the zero current duration is detected to be shorter than the second reference time, and a third situation that the latest on time for the past cycle is at a minimum value when the zero current duration is detected to be longer than the first reference time. For these situations, the on time of the switch keeps unchanged.

Figure 6:
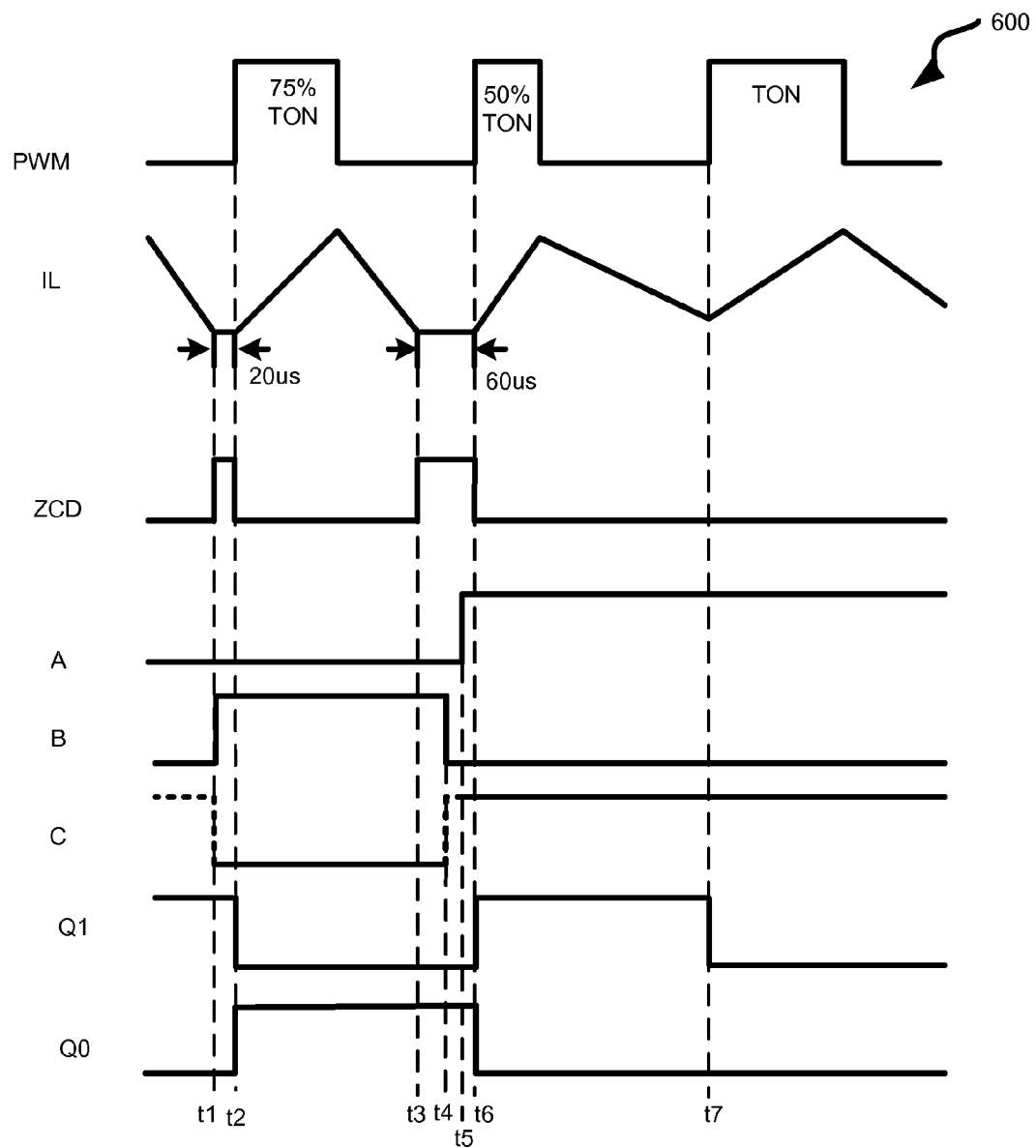
FIG. 6 illustrates a waveform diagram showing a plurality of signals in a circuit with reference to FIG. 5, according to an embodiment of the present invention.

FIG. 6 illustrates a waveform diagram showing a plurality of signals in a load judgment circuit with reference to FIG. 5 for illustrating the function of the load judgment circuit, according to an embodiment of the present invention. At time t1, inductor current IL drops to zero, the zero current detection signal ZCD transits from logic LOW to logic HIGH. Timers 511 and 512 start counting, and the outputs of timers 511 and 512 are in logic LOW. Signal A is determined by signals Q1, Q0, ZCD and the output of timer 511 as shown in FIG. 5, and signal A remains in logic LOW at this time. Signal B is determined by signals Q1, Q0, ZCD and the output of timer 512, and signal B transits from logic LOW to logic HIGH. Signal C is determined by signal A and signal B, and transits from a state for example high-resistance state to logic LOW ("0") according to Table 2 as shown above. After 20 us, at time t2, the output signal at the output terminal of the SMPS satisfies a predetermined condition, such as the output voltage feedback signal decreases and reaches a reference value, the PWM signal transits from logic LOW to logic HIGH. Thus switch S1 is turned on, thus the inductor current IL increases and the zero current detection signal ZCD transits from logic HIGH to logic LOW. Since 20 us is shorter than both the first reference time 25 us and the second reference time 50 us, the outputs of timers 511 and 512 maintain in logic LOW state, and signal C maintains in logic LOW state. At the leading edge of the PWM signal, the output (Q1,Q0) of the counter 525 is determined by signals ZCD and signal C. Since the zero current detection signal ZCD at the leading edge of the PWM signal is still in logic HIGH, counter 525 would not be reset, and signal (Q1,Q0) is determined by signal C at the clocking of the PWM signal, which is in logic LOW ("0"). With reference to Table 2 as shown above, signal (Q1,Q0) at the output of the counter 525 decreases by 1, from (1,0) to (0,1). And accordingly, the on time of the switch increases by a predetermined value 25%*TON and is set as 75%*TON.

At the end of the on time, the PWM signal transits from logic HIGH to logic LOW to turn off the switch, and inductor current IL decreases. If the load is light, the inductor current IL decreases quickly, and at time t3, inductor current decreases to zero, and zero current detection signal ZCD transits from logic LOW to logic HIGH. Timers 511 and 512 start counting and maintain in logic LOW. After 25 us, at time t4, the second timer 512 overflows and the output of timer 512 transits from logic LOW to logic HIGH, and signal B transits from logic HIGH to logic LOW. According to Table 2, signal C would be ignored and is in a third state. At time t5 which is 50 us after t3, the first timer 511 overflows and the output of the first timer 511 transits from logic LOW to logic HIGH. Accordingly, signal A transits from logic LOW to logic HIGH, and signal C transits to logic HIGH. At time t6, the PWM signal is triggered and transits from logic LOW to logic HIGH again. At the leading edge of the PWM signal, because signal C is in logic HIGH, according to Table 2, signal (Q1, Q0) provided by the counter 525 increases by 1 and transits from (0,1) to (1,0). And according to Table 1, the on time of the switch decreases by a predetermined value of 25%*TON, and is set as 50%*TON.

For the next cycle, the load is heavy, the inductor current keeps higher than zero, and the zero current detection signal ZCD keeps in logic LOW. And at time t7, at the leading edge of the PWM signal, the counter 525 is reset and signal (Q1, Q0) is set to (0,0). Accordingly, the on time of the switch is set as the maximum value TON.

The labels t1-t7 in FIGS. 2 and 6 are only for illustrating the time sequences in each drawing, and wherein the same label in different drawings indicates the irrelevant time points.

In some embodiments as illustrated above, an effective state of a signal is in logic HIGH state and an ineffective state of a signal is in logic LOW state. However, it should be known that the logic LOW state and the logic HIGH state may be interchanged in each embodiment for achieving the same functions.

And it should be understood that the numerals provided above such as 25 us, 50 us, 25%, 50% or 75% are only for illustration, and various numerals and possibilities are included in embodiments of the present invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A switching mode power supply (SMPS) for converting an input voltage at an input terminal into an output voltage at an output terminal, the SMPS comprising:
   a switch having a control end;
   an inductor coupled to the switch;
   a zero current detection circuit coupled to the inductor, the zero current detection circuit configured to detect an inductor current flowing through the inductor and provide a zero current detection signal, wherein the zero current detection signal is in an effective state only when the inductor current is at zero;
   a load judgment circuit coupled to the zero current detection circuit, the load judgment circuit configured to provide a plurality of status signals based on a zero current duration during when the zero current detection signal is in the effective state uninterruptedly; and
   a control signal generating circuit coupled to the output terminal and the load judgment circuit, the control signal generating circuit configured to provide a control signal which is coupled to the control end of the switch, wherein the control signal transits from a first state to a second state when a feedback signal indicative of an output signal at the output terminal satisfies a preset condition with a reference signal, and the control signal transits from the second state to the first state after an on time of the switch, and wherein the on time is controlled based on the plurality of status signals.

2. The SMPS of claim 1, wherein the load judgment circuit comprises at least one timer, the at least one timer configured to receive the zero current detection signal and detect a load condition based on the zero current duration.

3. The SMPS of claim 1, comprising a buck converter.

4. The SMPS of claim 1, wherein the load judgment circuit comprises:
   a first timer having an input and an output, wherein the input of the first timer is configured to receive the zero current detection signal, and the output of the first timer is configured to provide a first timing signal, and wherein when the zero current duration is longer than a first reference time, the first timing signal transits to an effective state;
   a second timer having an input and an output, wherein the input of the second timer is configured to receive the zero current detection signal, and the output of the second timer is configured to provide a second timing signal, and wherein when the zero current duration is longer than a second reference time, the second timing signal transits to an effective state, and further wherein the first reference time is longer than the second reference time; and
   a status signal generating circuit configured to generate the plurality of status signals based on the first timing signal and the second timing signal.

5. The SMPS of claim 4, wherein:
   when the zero current duration is longer than the first reference time and the latest on time in the past cycle is not at a minimum value, the on time of the switch decreases by a predetermined value; and
   when the zero current duration is shorter than the second reference time and the latest on time is not at a maximum value, the on time of the switch increases by a predetermined value.

6. The SMPS of claim 4, wherein the status signal generating circuit comprises:
   a first AND gate having a first input, a second input, a third input and an output, wherein the first input of the first AND gate is configured to receive the zero current detection signal, the second input of the first AND gate is configured to receive the first timing signal, and the output of the first AND gate is configured to provide a first logic signal;
   a NOT gate having an input and an output, wherein the input of the NOT gate is configured to receive the second timing signal;
   a second AND gate, having a first input, a second input, a third input and an output, wherein the first input of the second AND gate is coupled to the output of the NOT gate, the second input of the second AND gate is configured to receive the zero current detection signal, and the output of the second AND gate is configured to provide a second logic signal;

a first decoder, having a first input, a second input and an output, wherein the first input of the first decoder is configured to receive the first logic signal, the second input is configured to receive the second logic signal, and the output of the first decoder is configured to provide a third logic signal;

a counter having a first input, a second input, a timing input and an output, wherein the first input of the counter is configured to receive the third logic signal, the second input of the counter is configured to receive the zero current detection signal, the timing input of the counter is configured to receive the control signal, and wherein the output of the counter is coupled to the third input of the first AND gate and the third input of the second AND gate; and a second decoder coupled to the output of the counter, the second decoder configured to generate the plurality of status signals.

7. The SMPS of claim 6, wherein at the time of the control signal transiting from the first state to the second state, if the zero current detection signal is in an ineffective state, the plurality of status signals are configured to control the on time equaling a maximum value, and if the zero current detection signal is in the effective state and:

if the first logic signal is in an effective state and the second logic signal is in an ineffective state, the output of the first decoder is in an effective state to increase the counter by one, and accordingly the plurality of status signals are configured to decrease the on time by a predetermined value;

if the first logic signal is in an ineffective state an the second logic signal is in an effective state, the output of the first decoder is in an ineffective state to decrease the counter by one, and accordingly the plurality of status signals are configured to increase the on time by the predetermined value; or if the first logic signal and the second logic signal are both in the effective state or both in the ineffective state, the output of the first decoder and the on time remain the same as in the past cycle.

8. The SMPS of claim 1, wherein the plurality of status signals are logic signals.

9. The SMPS of claim 1, wherein the control signal generating circuit comprises:

an on time signal generator configured to generate an on time signal based on the plurality of status signals;

a comparator configured to compare the feedback signal with the reference signal, and provide a comparing signal; and an RS flip-latch having a setting input, a resetting input and an output, wherein the setting input is configured to receive the comparing signal, the resetting input is configured to receive the on time signal, and the output of the RS flip-latch is configured to provide the control signal;

wherein the control signal transits from the first state to the second state when the feedback signal is lower than the reference signal.

10. The SMPS of claim 9, wherein the on time signal generator comprises:

a plurality of current sources coupled in parallel;

a plurality of switches each coupled to a respective current source in series, and wherein each of the plurality of switches is controlled by a respective one of the plurality of status signals;

a capacitor coupled to the plurality of current sources;

a switch coupled across the capacitor, wherein the switch is controlled by an inverse signal of the control signal;

and a second comparator having a first input, a second input and an output, wherein the first input of the second comparator is coupled to the capacitor configured to receive the voltage across the capacitor, the second input of the second comparator is configured to receive a second reference signal, and the output of the second comparator is configured to provide the on time signal, and wherein the control signal transits from the second state to the first state when the voltage across the capacitor is higher than the second reference signal.

11. A controller for converting an input voltage of a SMPS to an output voltage at an output terminal of the SMPS by controlling a switch of the SMPS, the SMPS further comprising an inductor, the controller comprising:

a zero current detection circuit coupled to the inductor, the zero current detection circuit configured to detect an inductor current flowing through the inductor and provide a zero current detection signal, wherein the zero current detection signal is in an effective state only when the inductor current is at zero;

a load judgment circuit coupled to the zero current detection circuit, the load judgment circuit configured to provide a plurality of status signals based on a zero current duration during when the zero current detection signal is in the effective state uninterruptedly; and a control signal generating circuit coupled to the output terminal and the load judgment circuit, the control signal generating circuit configured to provide a control signal for controlling the switch, wherein the control signal transits from a first state to a second state when a feedback signal indicative of an output signal at the output terminal satisfies a predetermined relationship with a reference signal, and the control signal transits from the second state to the first state after an on time of the switch, and wherein the on time is controlled based on the plurality of status signals.

12. The controller of claim 11, wherein the load judgment circuit comprises at least one timer, the at least one timer configured to receive the zero current detection signal and detect the zero current duration.

13. The controller of claim 11, wherein the load judgment circuit comprises:

a first timer having an input and an output, wherein the input of the first timer is configured to receive the zero current detection signal, and the output of the first timer is configured to provide a first timing signal, and wherein when the zero current duration is longer than a first reference time, the first timing signal transits to an effective state;

a second timer having an input and an output, wherein the input of the second timer is configured to receive the zero current detection signal, and the output of the second timer is configured to provide a second timing signal, and wherein when the zero current duration is longer than a second reference time, the second timing signal transits to an effective state, and further wherein the first reference time is longer than the second reference time; and a status signal generating circuit configured to generate the plurality of status signals based on the first timing signal and the second timing signal.

14. The controller of claim 13, wherein:

when the zero current duration is longer than the first reference time and the latest on time in the past cycle is not at a minimum value, the on time of the switch decreases by a predetermined value; and when the zero current duration is shorter than the second reference time and the latest on time is not at a maximum value, the on time of the switch increases by a predetermined value.

15. The controller of claim 13, wherein the status signal generating circuit comprises:
- a first AND gate having a first input, a second input, a third input and an output, wherein the first input of the first AND gate is configured to receive the zero current detection signal, the second input of the first AND gate is configured to receive the first timing signal, and the output of the first AND gate is configured to provide a first logic signal;
- a NOT gate having an input and an output, wherein the input of the NOT gate is configured to receive the second timing signal;
- a second AND gate, having a first input, a second input, a third input and an output, wherein the first input of the second AND gate is coupled to the output of the NOT gate, the second input of the second AND gate is configured to receive the zero current detection signal, and the output of the second AND gate is configured to provide a second logic signal;
- a first decoder, having a first input, a second input and an output, wherein the first input of the first decoder is configured to receive the first logic signal, the second input of the first decoder is configured to receive the second logic signal, and the output of the first decoder is configured to provide a third logic signal;
- a counter having a first input, a second input, a timing input and an output, wherein the first input of the counter is configured to receive the third logic signal, the second input of the counter is configured to receive the zero current detection signal, the timing input of the counter is configured to receive the control signal, and wherein the output of the counter is coupled to the third input of the first AND gate and the third input of the second AND gate; and
- a second decoder coupled to the output of the counter and provide the plurality of status signals.

16. The controller of claim 15, wherein shortly before the time of the control signal transiting from the first state to the second state, if the zero current detection signal is in an ineffective state, the plurality of status signals are configured to control the on time equaling a maximum value, and if the zero current detection signal is in the effective state and:
- if the first logic signal is in an effective state and the second logic signal is in an ineffective state, the output of the first decoder is in an effective state to increase the counter by one, and accordingly the plurality of status signals is configured to decrease the on time by a predetermined value;
- if the first logic signal is in an ineffective state an the second logic signal is in an effective state, the output of the first decoder is in an ineffective state to decrease the counter by one, and accordingly the plurality of status signals is configured to increase the on time by the predetermined value; and
- if the first logic signal and the second logic signal are both in the effective state or both in the ineffective state, the output of the first decoder and the on time remain the same as in the past cycle.

17. The controller of claim 11, wherein the control signal generating circuit comprises:
- an on time signal generator configured to provide an on time signal based on the plurality of status signals, wherein the plurality of status signals are configured to control a current that charges a capacitor of the on time signal generator;
- a comparator configured to compare the feedback signal with the reference signal, and provide a comparing signal; and
- an RS flip-latch having a setting input, a resetting input and an output, wherein the setting input is configured to receive the comparing signal, the resetting input is configured to receive the on time signal, and the output of the RS flip-latch is configured to provide the control signal.

18. A method of reducing output ripple in a SMPS, the SMPS comprises a switch and an inductor, the method comprising:
- detecting an inductor current flowing through the inductor;
- detecting a zero current duration of the inductor current, wherein the zero current duration is a duration of when the inductor current is at zero in a cycle; and
- controlling the on time of the switch based on the zero current duration, wherein decreasing the on time for the next cycle by a predetermined value if the zero current duration is longer than a first reference time, and increasing the on time for the next cycle by the predetermined value if the zero current duration is shorter than a second reference time, wherein the first reference time is longer than the second reference time.

19. The method of claim 18, wherein controlling the on time of the switch further comprises: if the inductor current is higher than zero at the time rightly before the switch is turned ON, setting the on time at a maximum value.

* * * * *